US010906131B2

(12) United States Patent
Hashimoto et al.

(10) Patent No.: US 10,906,131 B2
(45) Date of Patent: Feb. 2, 2021

(54) METHOD FOR PROCESSING FILM

(71) Applicant: RIKEN TECHNOS CORPORATION, Tokyo (JP)

(72) Inventors: Taketo Hashimoto, Tokyo (JP); Hiroyuki Tomomatsu, Tokyo (JP)

(73) Assignee: RIKEN TECHNOS CORPORATION

( * ) Notice: Subject to any disclaimer, the term of this patent is extended or adjusted under 35 U.S.C. 154(b) by 0 days.

(21) Appl. No.: 15/510,043

(22) PCT Filed: Aug. 5, 2015

(86) PCT No.: PCT/JP2015/072232
§ 371 (c)(1),
(2) Date: Mar. 9, 2017

(87) PCT Pub. No.: WO2016/039049
PCT Pub. Date: Mar. 17, 2016

(65) Prior Publication Data
US 2017/0259379 A1  Sep. 14, 2017

(30) Foreign Application Priority Data

Sep. 9, 2014  (JP) ................. 2014-182861

(51) Int. Cl.
*B23K 26/18* (2006.01)
*B23K 26/38* (2014.01)
(Continued)

(52) U.S. Cl.
CPC .............. *B23K 26/18* (2013.01); *B23K 26/38* (2013.01); *B32B 37/06* (2013.01);
(Continued)

(58) Field of Classification Search
CPC ........ B23K 26/18; B23K 26/38; B32B 38/10; B32B 37/06; B32B 38/0004; B32B 2307/402; B32B 2310/0843
(Continued)

(56) References Cited

U.S. PATENT DOCUMENTS

| 2007/0181543 A1* | 8/2007 | Urairi | B23K 26/18 219/121.71 |
| 2010/0294423 A1* | 11/2010 | Takesue | B23K 26/0661 156/247 |
| 2014/0120344 A1* | 5/2014 | Yamamoto | B23K 26/38 428/343 |

FOREIGN PATENT DOCUMENTS

| CN | 103597046 A | 2/2014 |
| JP | 2001170791 A | 6/2001 |

(Continued)

OTHER PUBLICATIONS

Machine translation of JP2001-170791 date unknown.*
(Continued)

*Primary Examiner* — John L Goff, II
(74) *Attorney, Agent, or Firm* — Bracewell LLP; Brad Y. Chin

(57) ABSTRACT

Embodiments are directed to a method for processing a film, which includes: (A) a step wherein protective films are temporarily bonded to both surfaces of a film that is a material to be processed, thereby obtaining a film to be processed to both surfaces of which the protective films are bonded; and (B) a step wherein the film to be processed to both surfaces of which the protective films are bonded is cut using a laser having a wavelength at which the protective films have an absorbance of 50% or more. Other embodiments are directed to a method for processing a film, which includes: (A) a step wherein protective films are temporarily bonded to both surfaces of a film that is a material to be
(Continued)

processed, thereby obtaining a film to be processed to both surfaces of which the protective films are bonded; and (B') a step wherein the film to be processed to both surfaces of which the protective films are bonded is cut using a laser having a wavelength at which the film to be processed has an absorbance of 50% or more and the protective films have an absorbance of 50% or more.

12 Claims, 1 Drawing Sheet

(51) Int. Cl.
  B32B 37/06   (2006.01)
  B32B 38/00   (2006.01)
  B32B 37/26   (2006.01)
  B32B 38/10   (2006.01)
(52) U.S. Cl.
  CPC .......... B32B 38/0004 (2013.01); *B32B 37/26* (2013.01); *B32B 38/10* (2013.01); *B32B 2307/402* (2013.01); *B32B 2310/0843* (2013.01)
(58) Field of Classification Search
  USPC .................................................. 156/247–249
  See application file for complete search history.

(56) References Cited

FOREIGN PATENT DOCUMENTS

| JP | 2003205567 A | * | 7/2003 | |
|----|--------------|---|--------|---|
| JP | 2003341006 A |   | 12/2003 | |
| JP | 2004235194 A | * | 8/2004 | |
| JP | 2008203110 A |   | 9/2008 | |
| JP | 2011222847 A |   | 11/2011 | |
| JP | 2013098224 A | * | 5/2013 | ............ C09J 133/08 |
| WO | WO-2012172934 A1 | * | 12/2012 | ............ C09J 7/0264 |

OTHER PUBLICATIONS

Machine translation of JP 2013-098224 date unknown.*
Machine translation of JP 2004-235194 date unknown.*
Machine translation of JP 2003-341006 date unknown.*
Machine translation of JP 2003-205567 date uknown.*
CN201580048392.1 Office Action dated Feb. 24, 2018; 17pgs.
PCT/JP2015/072232 International Search Report dated Oct. 27, 2015; 1 pg.
CN201580048392 Office Action dated Oct. 17, 2018; 19 pgs.
TW104127313 Office Action dated Oct. 17, 2018; 12 pgs.
CN201580048392.1 Office Action dated Mar. 27, 2019; 13 pgs.
JP2015-150475 Office Action dated Mar. 7, 2019; 8 pgs.
CN201580048392.1Office Action dated Sep. 17, 2019, 13 pgs.
JP2015-150475 Office Action dated Oct. 3, 2019; 10 pgs.
CN201580048392.1 Rejection Decision dated Dec. 17, 2019, 20 pgs.

* cited by examiner

METHOD FOR PROCESSING FILM

CROSS REFERENCE TO RELATED APPLICATIONS

This application claims the benefit of and priority to PCT/JP2015/072232, filed on Aug. 5, 2015, entitled (translation), "METHOD FOR PROCESSING FILM," which claims the benefit of and priority to Japanese Patent Application No. 2014-182861, filed on Sep. 9, 2014, each of which is hereby incorporated by reference in their entirety into this application.

BACKGROUND

Field

Embodiments relate to a method for processing a film. More specifically, embodiments relate to a method for cutting a film with a laser.

Description of the Related Art

In laser processing for cutting, a laser is focused on the spot of a work material to be cut, such that the material is melted and evaporated at the spot. Such laser processing has been used in cutting a film (e.g., as described in JP 2003-341006A). The laser processing, however, has the following drawback: the substance melted and evaporated by laser irradiation adheres to the work material when resolidified by cooling, resulting in defects in appearance.

SUMMARY

Embodiments provide a method for cutting a film with a laser without causing defects in appearance of the film as a work material.

Embodiments temporarily bond a protective film to both surfaces of a film and cut with a laser having a wavelength at which the protective film has an absorbance of not smaller than a predetermined lower limit.

According to at least one embodiment, there is provided a method for processing a film, including the steps of: (A) temporarily bonding a protective film to both surfaces of a film as a work material, such that the work material film with the protective film bonded to both surfaces is prepared; and (B) cutting the work material film with the protective film bonded to both surfaces with a laser having a wavelength at which the protective film has an absorbance of 50% or more.

According to at least one embodiment, the protective film to be temporarily bonded in the step (A) includes a colorant and has an absorbance of 50% or more at the wavelength of the laser for use in the step (B).

According to another embodiment, there is provided a method for processing a film, including the steps of: (A) temporarily bonding a protective film to both surfaces of a film as a work material, such that the work material film with the protective film bonded to both surfaces is prepared; and (B') cutting the work material film with the protective film bonded to both surfaces with a laser having a wavelength at which the work material film has an absorbance of 50% or more, and the protective film has an absorbance of 50% or more.

According to at least one embodiment, the protective film to be temporarily bonded in the step (A) includes a colorant and has an absorbance of 50% or more at the wavelength of the laser for use in the step (B').

According to at least one embodiment, the method further includes the step of: (C) reducing adhesive strength between the protective film and the work material film to 2 N/25 mm or less with use of at least one selected from the group consisting of heat and an active energy ray.

According to another embodiment, there is provided a method for manufacturing an article including a work material film cut by a method for processing a film, including the steps of: (A) temporarily bonding a protective film to both surfaces of a film as a work material, such that the work material film with the protective film bonded to both surfaces is prepared; and (B) cutting the work material film with the protective film bonded to both surfaces with a laser having a wavelength at which the protective film has an absorbance of 50% or more.

According to another embodiment, there is provided a method for manufacturing an article including a work material film cut by a method for processing a film, including the steps of: (A) temporarily bonding a protective film to both surfaces of a film as a work material, such that the work material film with the protective film bonded to both surfaces is prepared; and (B') cutting the work material film with the protective film bonded to both surfaces with a laser having a wavelength at which the work material film has an absorbance of 50% or more, and the protective film has an absorbance of 50% or more.

DETAILED DESCRIPTION

Figure 1:
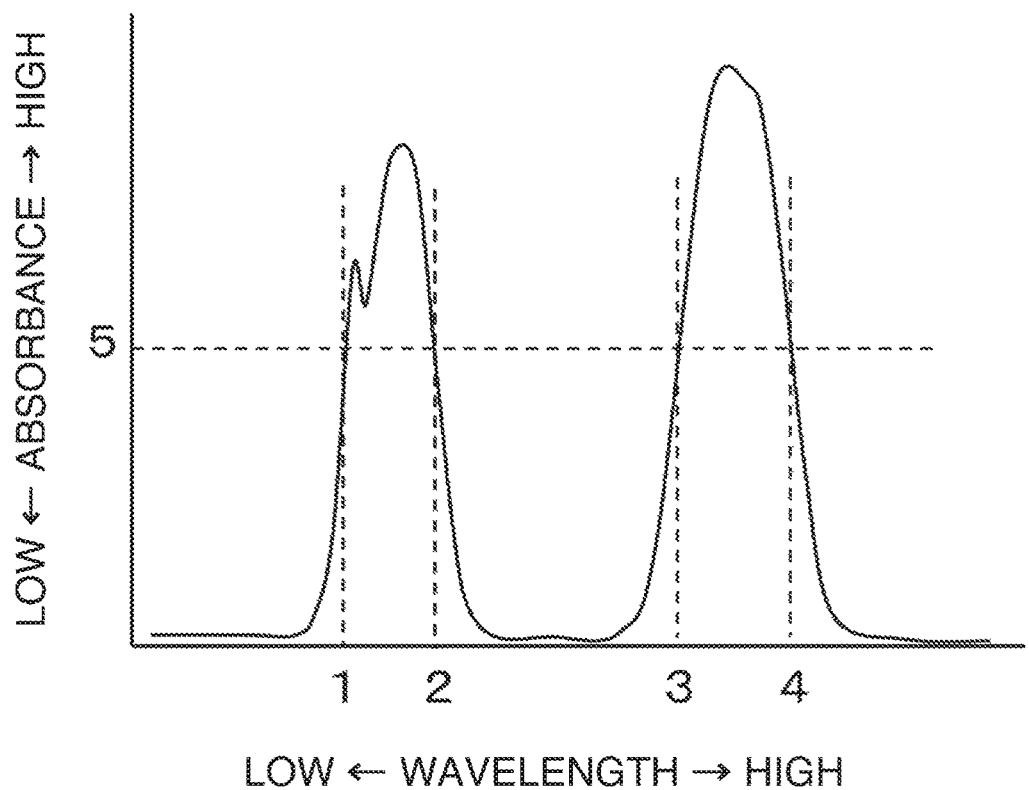
FIG. 1 is a conceptual diagram illustrating the wavelength at which a protective film has an absorbance of 50% or more.

Embodiments provide a method including a step (A) of temporarily bonding a protective film to both surfaces of a film as a work material, such that a work material film with the protective film bonded to both surfaces is prepared.

According to at least one embodiment, the protective film temporarily bonded to both surfaces of a film as a work material can act as greatly reducing the possibility of adhesion of substances melted and evaporated by laser irradiation to the film to cause defects in appearance.

Any protective film may be used without specific limitation as long as the protective film can be temporarily bonded to a film as a work material with a certain degree of strength and has an absorbance of 50% or more, preferably 70% or more, at the wavelength of the laser for use. Examples of the protective film include films of the following resins: a polyester resin such as an aromatic polyester and an aliphatic polyester; an acrylic resin; a polycarbonate resin; a polyolefin resin such as polyethylene, polypropylene, and polymethylpentene; a cellulose resin such as cellophane, triacetyl cellulose, diacetyl cellulose, and acetyl cellulose butyrate; a styrene resin such as polystyrene, an acrylonitrile-butadiene-styrene copolymer resin (an ABS resin), a styrene-ethylene-butene-styrene copolymer, and a styrene-ethylene-propylene-styrene copolymer; a polyvinyl chloride resin; a polyvinylidene chloride resin; a fluorine-containing resin such as polyvinylidene fluoride; and other resins such as polyvinyl alcohol, ethylene vinyl alcohol, polyether ether ketone, nylon, polyamide, polyimide, polyurethane, polyether imide, polysulfone, and polyether sulfone. These films include a non-stretched film, a uniaxially stretched film, and a biaxially stretched film. These films also include a lamination film of any one or more thereof.

The expression "can be temporarily bonded to a film as a work material with a certain degree of strength" referred to herein means that the adhesive strength which is determined in a 180° peeling test of the protective film and the film as a work material according to the method described below is normally 0.01 to 15 N/25 mm, preferably 0.05 to 10 N/25 mm, more preferably 0.05 to 2 N/25 mm, still more preferably 0.05 to 1.5 N/25 mm, most preferably 0.05 to 1 N/25 mm. With an adhesive strength in the range, the object of preventing defects in appearance in the step (B) can be reliably achieved. Furthermore, the possibility of damaging the film as a work material is low, when the protective film is removed.

According to at least one embodiment, the adhesive strength is determined in a 180° peeling test of the protective film and the film as a work material according to JIS Z0237:2009, under conditions with a testing rate of 300 mm/min. The longitudinal direction of a test piece was aligned with the machine direction of each of the protective film and the film as a work material.

According to at least one embodiment, the protective film for use may be a lamination protective film having a pressure-sensitive adhesive layer on at least one surface thereof. The lamination protective film having a pressure-sensitive adhesive layer as a whole needs to have an absorbance of 50% or more, preferably 70% or more, at the wavelength of the laser for use.

Any pressure-sensitive adhesive may be used without limitation. Preferred examples of the pressure-sensitive adhesive include those having a certain degree of high adhesive force, such that troubles such as peeling of the protective film are not caused until completion of the cutting. Preferred examples of the preferred pressure-sensitive adhesive also include those of which the adhesive strength to the film as a work material can be reduced to preferably 2 N/25 mm or less, more preferably 1.5 N/25 mm or less, still more preferably 1 N/25 mm or less, with use of heat, an active energy ray, or the like, such that the protective film can be peeled clean without adhesive deposit when peeled away and that the occurrence of defects such as cracks in the film as a work material can be prevented. The adhesive strength after reduction is preferably 0.01 N/25 mm or more, more preferably 0.05 N/25 mm or more, in order for the protective film to reliably prevent defects in appearance until immediately before use of the article made from the work material film as a component such as a touch panel.

Examples of the pressure-sensitive adhesives capable of reducing the adhesive strength by thermal curing or active energy ray curing include an pressure-sensitive adhesive having at least two reactive functional groups such as an amino group, a vinyl group, an epoxy group, a methacryloxy group, an acryloxy group, and an isocyanate group in a molecule; and an adhesive composition comprising the adhesive and at least one of an isocyanate curing agent, a photopolymerization initiator, and an organic peroxide. Examples of the pressure-sensitive adhesive capable of reducing the adhesive strength through foaming by heat or an active energy ray to reduce the actual adhesive area include a pressure-sensitive adhesive containing a foaming agent.

According to at least one embodiment, the isocyanate curing agent is a compound having at least two isocyanate groups in a molecule. Examples of the isocyanate curing agent include methylenebis-4-cyclohexylisocyanate; a polyisocyanate such as a trimethylolpropane adduct of tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, an isocyanurate of isophorone diisocyanate, and a biuret of hexamethylene diisocyanate; and a urethane cross-linking agent such as a block isocyanate of the polyisocyanate. One or a mixture of two or more of these may be used as the isocyanate curing agent. In cross-linking, a catalyst such as dibutyl tin dilaurate and dibutyl tin diethylhexoate may be added on an as needed basis.

Examples of the photopolymerization initiator include a benzophenone compound such as benzophenone, methyl-o-benzoylbenzoate, 4-methylbenzophenone, 4,4'-bis(diethylamino)benzophenone, o-benzoyl methyl benzoate, 4-phenylbenzophenone, 4-benzoyl-4'-methyldiphenylsulfide, 3,3', 4,4'-tetra(tert-butylperoxycarbonyl)benzophenone, and 2,4, 6-trimethylbenzophenone; a benzoin compound such as benzoin, benzoin methyl ether, benzoin ethyl ether, benzoin isopropyl ether, and benzyl methyl ketal; an acetophenone compound such as acetophenone, 2,2-dimethoxy-2-phenylacetophenone, and 1-hydroxycyclohexyl phenyl ketone; an anthraquinone compound such as methyl anthraquinone, 2-ethyl anthraquinone, and 2-amyl anthraquinone; a thioxanthone compound such as thioxanthone, 2,4-diethyl thioxanthone, and 2,4-diisopropyl thioxanthone; an alkyl phenone compound such as acetophenone dimethyl ketal; a triazine compound; a biimidazole compound; an acylphosphine oxide compound; a titanocene compound; an oxime ester compound; an oxime phenylacetate ester compound; a hydroxyl ketone compound; and an aminobenzoate compound. One or a mixture of two or more of these may be used as the photopolymerization initiator.

Examples of the organic peroxide include dicumylperoxide, di-tert-butylperoxide, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoylperoxide, p-chlorobenzoylperoxide, 2,4-dichlorobenzoylperoxide, tert-butylperoxybenzoate, tert-butylperoxyisopropyl carbonate, diacetylperoxide, lauroylperoxide, and tert-butylcumylperoxide. One or a mixture of two or more of these may be used as the organic peroxide.

Examples of the foaming agent include a thermally expandable microcapsule; an azo compound such as azodicarboxylic acid amide; a nitroso compound such as N,N'-dinitrosopentamethylene tetramine; a hydrogencarbonate such as sodium hydrogencarbonate and ammonium hydrogencarbonate; an organic acid such as citric acid, sodium citrate, and oxalic acid; sodium borohydride; and water. One or a mixture of two or more of these may be used as the foaming agent.

Commercially available examples of the protective film having such a pressure-sensitive adhesive or a pressure-sensitive adhesive layer are as follows. Examples of the pressure-sensitive adhesive reducing the adhesive strength by UV curing include "ACRYLIC-BASED LKG-1701 (trade name)" and "ACRYLIC-BASED LKG-1702" (trade name) manufactured by Fujikura Kasei Co., Ltd.; and examples of the protective film reducing the adhesive strength by thermal foaming include "EVALPHA" (trade name) manufactured by Nitto Denko Corporation.

According to at least one embodiment, the method can be applied to any film as a work material without limitation. The film as a work material may be a lamination film with a plurality of layers of at least one film. Examples of the lamination film include a hard-coat lamination film. The laser for use may be selected such that the film as a work material has an absorbance of preferably 50% or more, more preferably 70% or more, at the wavelength. More details are described below.

According to at least one embodiment, the film as a work material has a thickness of normally 20 µm or more, preferably 50 µm or more, from the viewpoint of easy handling in the execution of the method according to various embodiments, though not particularly limited. The thickness may be normally 1000 µm or less, preferably 300 µm or less, from the economical viewpoint.

According to at least one embodiment, the method includes a step (B) of cutting the work material film with the protective film bonded to both surfaces with a laser having a wavelength at which the protective film has an absorbance of 50% or more. Preferably, the method comprises a step (B') of cutting the work material film with the protective film bonded to both surfaces with a laser having a wavelength at which the work material film has an absorbance of 50% or more, and the protective film has an absorbance of 50% or more.

"The wavelength at which the protective film has an absorbance of 50% or more" referred to herein means a wavelength range in the absorption spectrum of a protective film measured by a spectrophotometer at which the absorbance is 50% or more. For example, in a conceptual diagram of the absorption spectrum (FIG. 1), the wavelength range from a wavelength 1 (the wavelength at which the absorbance is 50% on the lower wavelength side of a lower wavelength-side absorption peak) to a wavelength 2 (the wavelength at which the absorbance is 50% on the higher wavelength side of the lower wavelength-side absorption peak), or the wavelength range from a wavelength 3 (the wavelength at which the absorbance is 50% on the lower wavelength side of a higher wavelength-side absorption peak) to a wavelength 4 (the wavelength at which the absorbance is 50% on the higher wavelength side of the higher wavelength-side absorption peak) is "the wavelength at which the protective film has an absorbance of 50% or more." The measurement wavelength range of an absorption spectrum may be appropriately selected in accordance with the type of laser for use. For example, when a carbon dioxide gas laser is used, an infrared ray having a wavelength of 9.4 µm or a wavelength of 10.6 µm is generated. Accordingly, measurement of an absorption spectrum in the wavelength range of 2500 to 25000 nm (2.5 to 25 µm) is enough.

For example, the measurement in the wavelength range from 250 to 2500 nm may be performed with a spectrophotometer "SolidSpec-3700 (trade name)" manufactured by Shimadzu Corporation. The measurement in the wavelength range from 2500 to 25000 nm may be performed with a spectrophotometer "NICOLET IR380 (trade name)" manufactured by Thermo Fisher Scientific Inc.

In the case of a lamination protective film including a pressure-sensitive adhesive layer as the protective film, the wavelength range at which the absorbance is 50% or more is determined from the absorption spectrum of the lamination protective film as a whole.

Similarly, "the wavelength at which the work material film has an absorbance of 50% or more" referred to herein means a wavelength range in the absorption spectrum of the film as a work material measured by a spectrophotometer at which the absorbance is 50% or more. The measurement method is also the same as described above. In the case of a lamination film as a work material, the wavelength range at which the absorbance is 50% or more is determined from the absorption spectrum of the lamination film as a whole in the same manner.

The laser selected for use in the method according to various embodiments has a wavelength in the range at which the protective film has an absorbance of 50% or more, preferably 70% or more. With a laser wavelength in the range at which the protective film has an absorbance of 50% or more, preferably 70% or more, the material of the protective film at the laser focus can be instantly evaporated or sublimed to achieve cutting.

The laser selected for use in the method according to various embodiments preferably has a wavelength in the range at which the film as a work material has an absorbance of 50% or more, preferably 70% or more, and the protective film has an absorbance of 50% or more, preferably 70% or more. With a laser wavelength in the range at which the film as a work material has an absorbance of 50% or more, preferably 70% or more, and the protective film has an absorbance of 50% or more, preferably 70% or more, the materials of the protective film and the film as a work material at the laser focus can be instantly evaporated or sublimed to achieve cutting.

According to at least one embodiment, the substance instantly evaporated or sublimed requires much time to be cooled and resolidified. In the meanwhile, the substance can be removed or dispersed from the vicinity of the film as a work material with airflow, causing no defects in appearance of the film as a work material.

In contrast, when the wavelength conditions are not satisfied, the protective film and the film as a work material can be cut by the heat resulting from the molecular vibration caused by the laser irradiation. As a result, defects in appearance such as whiskers can occur in the film as a work material. Furthermore, a higher laser output power is required, which is uneconomical.

According to at least one embodiment, the laser for use is not particularly limited as long as the laser selected for use has a wavelength in the range at which the protective film has an absorbance of 50% or more, preferably 70% or more, preferably as long as the laser selected for use has a wavelength in the range at which the film as a work material has an absorbance of 50% or more, preferably 70% or more, and the protective film has an absorbance of 50% or more, preferably 70% or more. Examples of the laser include a gas laser such as a carbon dioxide gas laser, a helium neon laser, an argon ion laser, and an excimer laser; a solid-state laser such as a ruby laser with use of a chromium-doped ruby crystal as medium, a titanium sapphire laser with use of a titanium-doped sapphire crystal as medium, various YAG lasers with use of a YAG crystal of which yttrium is substituted with other rare earth elements, and a Nd-YAG laser with use of neodymium-doped YAG; a liquid laser; a semiconductor laser; a free electron laser; a metal vapor laser; and a chemical laser. The irradiation output is about 0.5 to 150 W, which can be appropriately controlled considering the thickness of the protective film, the thickness of the film as a work material, the processing rate, and the like.

Examples of preferred combination of the laser for use and the protective film include the combination of a carbon dioxide gas laser (wavelength: 10.6 µm and wavelength: 9.4 µm) and a biaxially stretched polyethylene terephthalate film or an aromatic polycarbonate film, and the combination of the fourth harmonic wave of a YAG laser (wavelength: 266 nm) and a biaxially stretched polyethylene terephthalate film or an aromatic polycarbonate film.

According to at least one embodiment, the protective film may contain a colorant and the like such that the protective film has an absorbance of 50% or more, preferably 70% or more, at the wavelength of the laser for use.

In this context, the colorant-containing protective film having an absorbance of 50% or more, preferably 70% or more, at the wavelength of the laser for use in the cutting step can be suitably used in the method according to various embodiments. On this occasion, prior to containing the colorant, the protective film may have an absorbance of less than 50% at the wavelength of the laser for use in the cutting step.

Any colorant may be used without limitation as long as the colorant can make the protective film have an absorbance of 50% or more, preferably 70% or more, at the wavelength of the laser for use in the cutting step. A UV absorber, an IR absorber, and a far IR absorber can have the same effect as the colorant depending on the wavelength of the laser for use, from the viewpoint of the emergence mechanism of the characteristics of the colorant.

According to at least one embodiment, the protective film has a thickness (the thickness with a pressure-sensitive adhesive layer being included if any) of normally 20 to 250 µm, preferably 30 to 200 µm, more preferably 40 to 160 µm.

Preferably, the method according to various embodiments further includes a step (C) of reducing the adhesive strength between the protective film and the work material film to 2 N/25 mm or less with use of at least one selected from the group consisting of heat and an active energy ray, after completion of the cutting step.

By performing the adhesive-strength reducing step after the cutting step, an adhesive strength between the protective film and the work material film is reduced from more than 2 N/25 mm at the end of the cutting step to 2 N/25 mm or less. Until completion of the cutting, troubles such as peeling of the protective film can be thus prevented with a certain degree of high adhesive force. Furthermore, the protective film can be peeled clean without adhesive deposit when peeled away. And, the occurrence of defects such as cracks in the film as a work material can be prevented.

According to at least one embodiment, the implementation of the adhesive-strength reducing step is as described above in the section of the lamination protective film.

According to at least one embodiment, the method can be applied to any work material film. The method is useful for cutting a hard-coat lamination film, particularly for cutting a hard-coat lamination film having a hard coat with a high surface hardness. With use of the method according to various embodiments, an article to be suitably used as the display panel or the transparent conductive substrate of a touch panel can be made from a hard-coat lamination film.

EXAMPLES

Embodiments are described with reference to Examples as follows, though the various embodiments are not limited thereto.

Evaluation and Measurement Methods of Physical Properties (i) Absorption Spectrum and Absorbance The absorption spectrum of a target film was measured with a spectrophotometer "NICOLET IR380 (trade name)" available from Thermo Fisher Scientific Inc., so that the absorbances of a carbon dioxide gas laser (wavelength: 9.4 µm and wavelength: 10.6 µm) were calculated. The absorption spectrum of a target film was also measured with a spectrophotometer "SolidSpec-3700 (trade name)" manufactured by Shimadzu Corporation, so that the absorbances of the third harmonic wave of a YAG laser (wavelength: 355 nm) and fourth harmonic wave of a YAG laser (wavelength: 266 nm) were calculated.

(ii) Adhesive Strength

The adhesive strength was measured in a 180° peeling test of the protective film and the film as a work material according to JIS Z0237:2009, under conditions with a testing rate of 300 mm/min. The longitudinal direction of the test piece was aligned with the machine direction of each of the protective film and the work material film.

(iii) Cutting Processability

The cut edge was visually inspected or observed with a microscope (magnification power: 100) and then evaluated according to the following criteria.

◎ (excellent): No cracks, no whiskers, and no discoloration are observed even in the microscopic observation.

○ (good): No cracks and no discoloration are observed even in the microscopic observation. Minute whiskers are observed in the microscopic observation (no whiskers are visually detected).

Δ (poor): No cracks are observed even in the microscopic observation. Discoloration spots and whiskers are visually detected.

× (very poor): Cracks, whiskers, and discoloration are visually detected.

Raw Materials for Use (a) Protective Film (a1): A white transparent polyester resin film having a thickness of 100 µm was used as the substrate of a protective film. A pressure-sensitive adhesive was obtained by mixing and stirring 100 parts by mass of a UV curable pressure-sensitive adhesive "ACRYLIC-BASED LKG-1702" (trade name) available from Fujikura Kasei Co., Ltd., 6.1 parts by mass of an isocyanate curing agent "LKG-17HN02" (trade name) available from Fujikura Kasei Co., Ltd., 0.85 parts by mass of a photopolymerization initiator "KN-101" (trade name) available from Fujikura Kasei Co., Ltd., and 50 parts by mass of ethyl acetate. The pressure-sensitive adhesive obtained was applied to one surface of the substrate with a Meyer bar film applicator to have a thickness of 10 µm after drying, so that a lamination protective film was obtained.

(a2): A lamination protective film was obtained in the same manner as in (a1) described above, except that a white transparent biaxially stretched polyethylene terephthalate film having a thickness of 100 µm was used as the substrate of the protective film.

(a3): A lamination protective film was obtained in the same manner as in (a1) described above, except that a white transparent aromatic polycarbonate film having a thickness of 100 µm was used as the substrate of the protective film.

(a4): A lamination protective film was obtained in the same manner as in (a1) described above, except that a blue transparent polypropylene film having a thickness of 100 µm was used as the substrate of the protective film.

(a5): A lamination protective film was obtained in the same manner as in (a1) described above, except that a white transparent polypropylene film having a thickness of 100 µm was used as the substrate of the protective film.

(a6): A lamination protective film was obtained in the same manner as in (a1) described above, except that the pressure-sensitive adhesive for use was obtained by mixing and stirring 100 parts by mass of a UV curable adhesive "ACRYLIC-BASED LKG-1701" (trade name) available from Fujikura Kasei Co., Ltd., 3.0 parts by mass of an isocyanate curing agent "LKG-17HN01" (trade name) available from Fujikura Kasei Co., Ltd., 1.5 parts by mass of a photopolymerization initiator "KN-101" (trade name) available from Fujikura Kasei Co., Ltd., and 50 parts by mass of ethyl acetate.

(a7): A lamination protective film was obtained in the same manner as in (a1) described above, except that the amount of the isocyanate curing agent "LKG-17HN02" (trade name) available from Fujikura Kasei Co., Ltd. blended was changed to 12.2 parts by mass, and the amount of the photopolymerization initiator "KN-101" (trade name) available from Fujikura Kasei Co., Ltd. blended was changed to 1.7 parts by mass.

The absorption spectra of the (a1) to (a7) were measured and the absorbances of the carbon dioxide gas laser (wavelength: 9.4 μm and wavelength: 10.6 μm) and the absorbances of the third harmonic wave of a YAG laser (wavelength: 355 nm) and fourth harmonic wave of a YAG laser (wavelength: 266 nm) were calculated. The results are shown in Table 1. The unit of the values in the table is %.

(b) Work Material Film (b1): A white transparent film having a thickness of 250 μm was obtained from a poly(meth)acrylimide "PLEXIMID TT70" (trade name) available from Evonik Industries AG, with a unit having a 50-mm extruder (equipped with a double flight screw having an L/D of 29 and a CR of 1.86); a T-die with a die width of 680 mm; and a drawing and winding machine having a mechanism for pressing a molten film with a mirror-finished roll and a mirror-finished belt. On this occasion, the preset conditions included a preset temperature of the extruder of C1/C2/C3/AD of 280/300/320/320° C.; a preset temperature of the T-die of 320° C.; a lip opening of the T-die of 0.5 mm; a preset temperature of the mirror-surface roll of 140° C.; a preset temperature of the mirror-finished belt of 120° C.; a pressing pressure of the mirror-finished belt of 1.4 MPa; and a drawing rate of 5.6 m/min. Subsequently, both surfaces of the film thus obtained were subjected to a corona discharge treatment under conditions for an amount treated of 167 W·min/m² (discharge power: 500 W, length of discharge electrode: 1 m, line velocity: 3 m/min). Both of the surfaces had a wetting index of 64 mN/m. Subsequently, a coating material obtained by mixing and stirring 50 parts by mass of the following (γa), 50 parts by mass of the following (γb), 50 parts by mass of the following (γc), 2 parts by mass of the following (γd), 1 part by mass of the following (γe), 4 parts by mass of the following (γg), 1 part by mass of the following (γh), and 20 parts by mass of the following (γi) was applied to one of the surfaces with a die-coating device to have a thickness of 25 μm after curing, so that a hard coat layer was formed. A coating material obtained by mixing and stirring 50 parts by mass of the following (γa), 50 parts by mass of the following (γb), 50 parts by mass of the following (γc), 2 parts by mass of the following (γd), 0.5 parts by mass of the following (γf), 4 parts by mass of the following (γg), 1 part by mass of the following (γh), and 20 parts by mass of the following (γi) was applied to the other surface with a die-coating device to have a thickness of 25 μm after curing, so that a hard coat layer was formed. A lamination film having the hard coat layer on each of the surfaces was thus obtained. Each of the surfaces had a pencil hardness of 9H in the measurement with use of a pencil "UNI" (trade name) available from Mitsubishi Pencil Co., Ltd. under a load condition of 750 g according to JIS K5600-5-4.

(b2): A coating material obtained by mixing and stirring 50 parts by mass of the following (γa), 50 parts by mass of the following (γb), 50 parts by mass of the following (γc), 2 parts by mass of the following (γd), 1 part by mass of the following (γe), 4 parts by mass of the following (γg), 1 part by mass of the following (γh), and 20 parts by mass of the following (γi) was applied to one of the surfaces of a white transparent biaxially stretched polyethylene terephthalate film having a thickness of 250 μm with a die-coating device to have a thickness of 25 μm after curing, so that a hard coat layer was formed. Subsequently, a coating material obtained by mixing and stirring 50 parts by mass of the following (γa), 50 parts by mass of the following (γb), 50 parts by mass of the following (γc), 2 parts by mass of the following (γd), 0.5 parts by mass of the following (γf), 4 parts by mass of the following (γg), 1 part by mass of the following (γh), and 20 parts by mass of the following (γi) was applied to the other surface with a die-coating device to have a thickness of 25 μm after curing, so that a hard coat layer was formed. A lamination film having the hard coat layer on each of the surfaces was thus obtained. Each of the surfaces had a pencil hardness of 5H in the measurement according to the method described above.

(γa): Dipentaerythritol hexaacrylate available from Nippon Kayaku Co., Ltd.

(γb): A coating material "Laromer PO9026" (trade name) available from BASF SE, containing a mixture of polyether acrylate and nanosilica (average particle diameter: 20 nm) at 50:50 (mass ratio)

(γc): A surface modified nanosilica (average particle diameter: 15 nm) dispersion in methyl isobutyl ketone (solid content: 30 mass %) "MIBK-ST" (trade name) available from Nissan Chemical Industries, Ltd.

(γd): An acrylic silane coupling agent (3-acryloxypropyl trimethoxysilane) "KBM-5103" (trade name) available from Shin-Etsu Chemical Co., Ltd.

(γe): A fluorine water repellent "Fluorolink AD1700" (trade name) available from Solvay Solexis S.p.A.

(γf): A surface conditioner "BYK-399" (trade name) available from BYK Japan KK (γg): A phenyl ketone photopolymerization initiator (1-hydroxycyclohexyl phenyl ketone) "SB-PI714" (trade name) available from Shuang-Bang Ind. Corp.

(γh): A trifunctional polyisocyanate "CORONATE HX" (trade name) available from Nippon Polyurethane Industry Co., Ltd.

(γi): 1-Methoxy-2-propanol

The absorption spectra of the (b1) and (b2) were measured and the absorbances of carbon dioxide gas lasers (wavelength: 9.4 μm and wavelength: 10.6 μm) and the absorbances of the third harmonic wave of a YAG laser (wavelength: 355 nm) and fourth harmonic wave of a YAG laser (wavelength: 266 nm) were calculated. The results are shown in Table 1. The unit of the values in the table is %.

TABLE 1

Measurement of absorbances of protective films and work material films

|  | (a1) | (a2) | (a3) | (a4) | (a5) | (a6) | (a7) |
|---|---|---|---|---|---|---|---|
| Carbon dioxide gas 10.6 μm | 87 | 52 | 89 | 28 | 28 | 86 | 88 |
| Carbon dioxide gas 9.6 μm | 90 | 78 | 88 | 45 | 31 | 88 | 90 |

TABLE 1-continued

Measurement of absorbances of protective films and work material films

| | | | | | | | |
|---|---|---|---|---|---|---|---|
| Third harmonic wave of YAG: 355 nm | 12 | <1.0 | <1.0 | 58 | 10 | 16 | 13 |
| Fourth harmonic wave of YAG: 266 nm | 77 | 65 | 81 | 52 | 25 | 78 | 76 |

| | (b1) | (b2) |
|---|---|---|
| Carbon dioxide gas 10.6 μm | 94 | 65 |
| Carbon dioxide gas 9.6 μm | 91 | 83 |
| Third harmonic wave of YAG: 355 nm | 83 | 14 |
| Fourth harmonic wave of YAG: 266 nm | 88 | 68 |

Example 1

Figure 2:
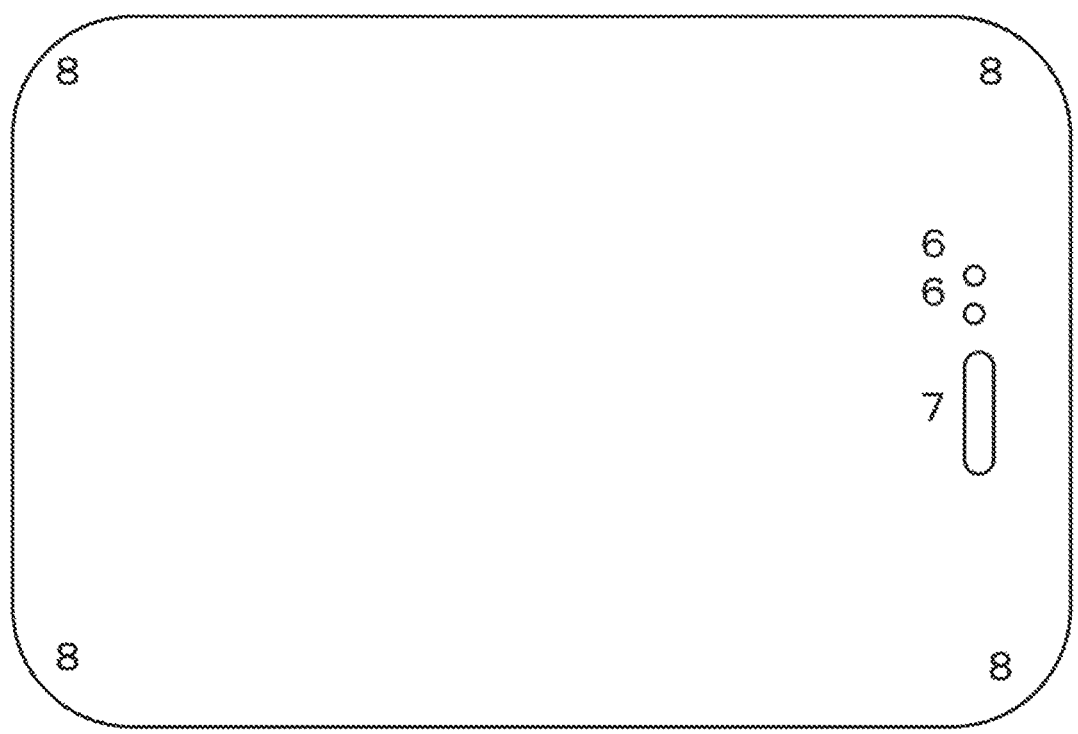
FIG. 2 is a conceptual diagram showing the plan view of an article manufactured in Example 1.

The (a1) was temporarily bonded to both surfaces of the (b1) such that the pressure-sensitive adhesive layer of the (a1) was disposed adjacent to the (b1). The measured adhesive strength between the (a1) and the (b1) was 3.8 N/25 mm. Subsequently, an article was made as illustrated in FIG. 2 by cutting with carbon dioxide gas lasers (wavelength: 9.4 μm and wavelength: 10.6 μm). In FIG. 2, a circular cut hole 6 having a radius of 0.1 mm, a cut hole 7 with both ends having a radius of curvature of 0.5 mm, and a corner part 8 having a radius of curvature of 10 mm are shown.

The article with the protective film thus obtained was irradiated with UV at 100 mJ/cm$^2$ from a high pressure mercury lamp as light source. The adhesive strength between the protective film and the article was 0.5 N/25 mm after the irradiation, and the protective film was able to be easily peeled away without causing any defects in appearance of the article. The article obtained was subjected to the test (iii) on the cutting processability. The results are shown in Table 2.

Example 2

Except that the (a1) was replaced with the (a2) for use, an article with the protective film was manufactured and subjected to UV irradiation in the exact same manner as in Example 1. The test results on the adhesive strength and the cutting processability are shown in Table 2.

Example 3

Except that the (a1) was replaced with the (a3) for use, an article with the protective film was manufactured and subjected to UV irradiation in the exact same manner as in Example 1. The test results on the adhesive strength and the cutting processability are shown in Table 2.

Example 4

Except that the (a1) was replaced with the (a4) for use, and that the third harmonic wave of a YAG laser (wavelength: 355 nm) was used instead of the carbon dioxide gas lasers, an article with the protective film was manufactured and subjected to UV irradiation in the exact same manner as in Example 1. The test results on the adhesive strength and the cutting processability are shown in Table 2.

Example 5

Except that the fourth harmonic wave of a YAG laser (wavelength: 266 nm) was used instead of the carbon dioxide gas lasers, an article with the protective film was manufactured and subjected to UV irradiation in the exact same manner as in Example 1. The test results on the adhesive strength and the cutting processability are shown in Table 2.

Example 6

Except that the (b1) was replaced with the (b2) for use, and that the fourth harmonic wave of a YAG laser (wavelength: 266 nm) was used instead of the carbon dioxide gas lasers, an article with the protective film was manufactured and subjected to UV irradiation in the exact same manner as in Example 1. The test results on the adhesive strength and the cutting processability are shown in Table 2.

Comparative Example 1

Except that the (a1) was replaced with the (a4) for use, an article with the protective film was manufactured and subjected to UV irradiation in the exact same manner as in Example 1. The test results on the adhesive strength and the cutting processability are shown in Table 2.

Comparative Example 2

Except that the third harmonic wave of a YAG laser (wavelength: 355 nm) was used instead of the carbon dioxide gas lasers, an article with the protective film was manufactured and subjected to UV irradiation in the exact same manner as in Example 1. The test results on the adhesive strength and the cutting processability are shown in Table 2.

Comparative Example 3

Except that the (a1) was replaced with the (a5) for use, and that the third harmonic wave of a YAG laser (wavelength: 355 nm) was used instead of the carbon dioxide gas lasers, an article with the protective film was manufactured and subjected to UV irradiation in the exact same manner as in Example 1. Namely, the only difference between Example 4 and Comparative Example 3 is in the substrate of the protective film, made of the blue transparent polypropylene film (a4) (containing a colorant) or made of the white transparent polypropylene film (a5) (containing no colorant). The test results on the adhesive strength and the cutting processability are shown in Table 2.

Example 7

Except that the (a1) was replaced with the (a6) for use, an article with the protective film was manufactured and subjected to UV irradiation in the exact same manner as in Example 1. The adhesive strength between the protective film and the article was 2.0 N/25 mm after the irradiation, and it was found that the article had minute exfoliation marks detectable with a loupe (magnification power: 10), not visually detected when the protective film was peeled away. The test results on the adhesive strength and the cutting processability are shown in Table 2.

Example 8

Except that the (a1) was replaced with the (a6) for use, and that the amount of UV irradiation was changed from 100 mJ/cm$^2$ to 200 mJ/cm$^2$, an article with the protective film was manufactured and subjected to UV irradiation in the exact same manner as in Example 1. The adhesive strength between the protective film and the article was 1.5 N/25 mm after the irradiation, and the support was able to be easily peeled away without causing any defects in appearance of the article. The test results on the adhesive strength and the cutting processability are shown in Table 2.

Example 9

The (a7) was temporarily bonded to both surfaces of the (b1) such that the adhesive layer of the (a7) was disposed adjacent to the (b1). The measured adhesive strength between the (a7) and the (b1) was 2.1 N/25 mm. Subsequently, an article was made as illustrated in FIG. 2 by cutting with carbon dioxide gas lasers (wavelength: 9.4 μm and wavelength: 10.6 μm). It was found that the work material film had minute exfoliation marks detectable with a loupe (magnification power: 10), not visually detected when the protective film was peeled away from the article. The test results on the adhesive strength and the cutting processability are shown in Table 2.

In each of the examples according to the method according to various embodiments, the hard-coat lamination film as a work material was able to be cut with the laser without causing defects in appearance.

It was confirmed in each of the inventive examples that the problem of defects in appearance was able to be solved by the colorant-containing protective film having an absorbance of 50% or more at the wavelength of the laser for use, even when the protective film has an absorbance of less than 50% at the wavelength of the laser for use without containing a colorant.

In contrast, visually detectable discoloration spots and whiskers occurred at the cut edge in each of the Comparative Examples.

Various embodiments provide non-obvious advantages over the convention art. For example, the method according to various embodiments enables a film to be cut with a laser without causing defects in appearance of the film as a work material. Accordingly, the method can be suitably used to cut a hard-coat lamination film, particularly to cut a hard-coat lamination film having a hard coat with a high surface hardness.

REFERENCE SIGNS LIST

1: Wavelength at which the absorbance is 50% on the lower wavelength side of a lower wavelength-side absorption peak
2: Wavelength at which the absorbance is 50% on the higher wavelength side of a lower wavelength-side absorption peak
3: Wavelength at which the absorbance is 50% on the lower wavelength side of a higher wavelength-side absorption peak
4: Wavelength at which the absorbance is 50% on the higher wavelength side of a higher wavelength-side absorption peak
5: Line at an absorbance of 50%

TABLE 2

Film processing conditions and evaluation on cutting processability

| | Example 1 | Example 2 | Example 3 | Example 4 | Example 5 | Example 6 |
|---|---|---|---|---|---|---|
| Protective film | (a1) | (a2) | (a3) | (a4) | (a1) | (a1) |
| Work material film | (b1) | (b1) | (b1) | (b1) | (b1) | (b2) |
| Laser for use | Carbon dioxide | Carbon dioxide | Carbon dioxide | YAG3 | YAG4 | YAG4 |
| Adhesive strength N/25 mm | 3.8 | 3.9 | 4.0 | 3.6 | 3.9 | 3.8 |
| Adhesive strength after irradiation N/25 mm | 0.5 | 0.6 | 0.6 | 0.5 | 0.5 | 0.5 |
| Cutting processability | ◎ | ○ | ◎ | ○ | ◎ | ○ |

| | Comparative Example 1 | Comparative Example 2 | Comparative Example 3 | Example 7 | Example 8 | Example 9 |
|---|---|---|---|---|---|---|
| Protective film | (a4) | (a1) | (a5) | (a6) | (a6) | (a7) |
| Work material film | (b1) | (b1) | (b1) | (b1) | (b1) | (b1) |
| Laser for use | Carbon dioxide | YAG3 | YAG3 | Carbon dioxide | Carbon dioxide | Carbon dioxide |
| Adhesive strength N/25 mm | 3.6 | 3.7 | 3.7 | 11.3 | 11.6 | 2.1 |
| Adhesive strength after irradiation N/25 mm | 0.6 | 0.5 | 0.5 | 2.0 | 1.5 | — |
| Cutting processability | Δ | Δ | Δ | ◎ | ◎ | ◎ |

6: A circular cut hole having a radius of 0.1 mm
7: A cut hole with both ends having a radius of curvature of 0.5 mm
8: A corner part having a radius of curvature of 10 mm

The invention claimed is:

1. A method for processing a hard-coat lamination film, comprising the steps of:
    (A) temporarily bonding a protective film to both surfaces of a hard-coat lamination film as a work material, such that the work material film with the protective film bonded to both surfaces is prepared and an adhesive strength between the protective film and the work material film is more than 2 N/25 mm at a peeling rate of 300 mm/min;
    (B) selecting beforehand a laser having a wavelength at which the protective film bonded to both surfaces of the work material film has an absorbance of 70% or more depending on a type of a material from which the protective film is made and then cutting an entire set of the work material film with the protective film bonded to both surfaces with the laser having the wavelength at which the protective film has the absorbance of 70% or more; and
    (C) reducing adhesive strength between the protective film and the work material film from more than 2N/25 mm at a peeling rate of 300 mm/min to less than 1.0 N/25 mm at a peeling rate of 300 mm/min with use of at least one selected from the group consisting of heat and an active energy ray, and then removing the cut protective film from both surfaces of the cut work material film.

2. The method according to claim 1, wherein the protective film to be temporarily bonded in the step (A) comprises a colorant and has an absorbance of 70% or more at the wavelength of the laser for use in the step (B).

3. A method for processing a hard-coat lamination film, comprising the steps of:
    (A) temporarily bonding a protective film to both surfaces of a hard-coat lamination film as a work material, such that the work material film with the protective film bonded to both surfaces is prepared and an adhesive strength between the protective film and the work material film is more than 2 N/25 mm at a peeling rate of 300 mm/min;
    (B') selecting beforehand a laser having a wavelength at which the work material film has an absorbance of 70% or more, and the protective film bonded to both surfaces of the work material film has an absorbance of 70% or more depending on a type of a material from which the work material film is made and a type of a material from which the protective film is made, and then cutting an entire set of the work material film with the protective film bonded to both surfaces with the laser having the wavelength at which the work material film has the absorbance of 70% or more, and the protective film has the absorbance of 70% or more; and
    (C) reducing adhesive strength between the protective film and the work material film from more than 2N/25 mm at a peeling rate of 300 mm/min to less than 1.0 N/25 mm at a peeling rate of 300 mm/min with use of at least one selected from the group consisting of heat and an active energy ray, and removing the cut protective film from both surfaces of the cut work material film.

4. The method according to claim 3, wherein the protective film to be temporarily bonded in the step (A) comprises a colorant and has an absorbance of 70% or more at the wavelength of the laser for use in the step (B').

5. The method according to claim 1, wherein the adhesive strength between the protective film and the work material film is reduced to 0.01-0.6 N/25 mm at a peeling rate of 300 mm/min in step (C).

6. A method for manufacturing a display panel or a transparent conductive substrate, comprising the steps of:
    cutting a hard-coat lamination film as a work material film using the method according to claim 1; and
    combining the cut work material film with another member thereby incorporating the cut work material film into the display panel or the transparent conductive substrate as a part of the display panel or the transparent conductive substrate.

7. The method according to claim 3, wherein the adhesive strength between the protective film and the work material film is reduced to 0.01-0.6 N/25 mm at a peeling rate of 300 mm/min in step (C).

8. A method for manufacturing a display panel or a transparent conductive substrate, comprising:
    cutting a hard-coat lamination film as a work material film using the method according to claim 3; and
    combining the cut work material film with another member thereby incorporating the cut work material film into the display panel or the transparent conductive substrate as a part of the display panel or the transparent conductive substrate.

9. The method according to claim 1, wherein the protective film is a bi-axially stretched polyethylene terephthalate film or an aromatic polycarbonate film.

10. The method according to claim 3, wherein the protective film is a bi-axially stretched polyethylene terephthalate film or an aromatic polycarbonate film.

11. The method according to claim 1, wherein the laser is a fourth harmonic wave of a YAG laser in step (B).

12. The method according to claim 3, wherein the laser is a fourth harmonic wave of a YAG laser in step (B').

* * * * *